(12) United States Patent
Hyun et al.

(10) Patent No.: US 9,055,196 B2
(45) Date of Patent: Jun. 9, 2015

(54) METHOD AND APPARATUS FOR FORMING HIGHLIGHT CONTENT

(75) Inventors: Lyun-sik Hyun, Seoul (KR); Se-jun Han, Daejeon (KR); Hyok-sung Choi, Seoul (KR); Su-hyun Kim, Seoul (KR); Seong-kook Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1044 days.

(21) Appl. No.: 12/539,155

(22) Filed: Aug. 11, 2009

(65) Prior Publication Data

US 2010/0186052 A1 Jul. 22, 2010

(30) Foreign Application Priority Data

Jan. 21, 2009 (KR) ........................ 10-2009-0005151

(51) Int. Cl.

| H04N 5/445 | (2011.01) |
| H04N 7/173 | (2011.01) |
| G06F 17/30 | (2006.01) |
| G11B 27/034 | (2006.01) |
| G11B 27/28 | (2006.01) |
| G11B 27/34 | (2006.01) |
| H04N 21/472 | (2011.01) |
| H04N 21/475 | (2011.01) |

(Continued)

(52) U.S. Cl.
CPC ...... *H04N 7/17336* (2013.01); *G06F 17/30781* (2013.01); *G11B 27/034* (2013.01); *G11B 27/28* (2013.01); *G11B 27/34* (2013.01); *H04N 21/47202* (2013.01); *H04N 21/4756* (2013.01); *H04N 21/8455* (2013.01); *H04N 21/8549* (2013.01)

(58) Field of Classification Search
CPC ............ H04N 21/8549; H04N 21/443; H04N 21/42204; H04N 21/8455; H04N 21/4825
USPC .......................... 725/40, 88, 41, 47; 715/723
See application file for complete search history.

(56) References Cited

U.S. PATENT DOCUMENTS 6,973,256 B1 12/2005 Dagtas
7,796,857 B2 * 9/2010 Hiroi et al. ................... 386/248

(Continued)

FOREIGN PATENT DOCUMENTS

| EP | 1954041 A1 | 8/2008 |
| JP | 2004-513547 A | 4/2004 |

(Continued)

OTHER PUBLICATIONS

Communication from the Korean Intellectual Property Office dated Mar. 6, 2015 in a counterpart Korean application No. 10-2009-0005151.

*Primary Examiner* — Benjamin R Bruckart
*Assistant Examiner* — Aklil Tesfaye
(74) *Attorney, Agent, or Firm* — Sughrue Mion, PLLC

(57) ABSTRACT

Provided are apparatuses and methods for forming highlight content, the apparatus including a receiving unit receiving a highlight content formation command which requests formation of the highlight content; an event detection unit detecting an event generation point-in-time for each event of a program from which the highlight content is to be formed, wherein the event generation point-in-time is a point of time at which an event occurs; and a highlight content generation unit forming highlight content for each event from content corresponding to a predetermined period of time ranging before and after the event generation point-in-time.

14 Claims, 6 Drawing Sheets

(51) Int. Cl.
*H04N 21/845* (2011.01)
*H04N 21/8549* (2011.01)

(56) References Cited

U.S. PATENT DOCUMENTS

| | | | | |
|---|---|---|---|---|
| 2003/0126604 A1* | 7/2003 | Suh | | 725/38 |
| 2006/0233522 A1* | 10/2006 | Hiroi et al. | | 386/95 |
| 2007/0094602 A1* | 4/2007 | Murabayashi | | 715/723 |
| 2009/0132924 A1* | 5/2009 | Vasa et al. | | 715/723 |
| 2010/0023964 A1* | 1/2010 | Basso et al. | | 725/32 |
| 2010/0153984 A1* | 6/2010 | Neufeld | | 725/14 |

FOREIGN PATENT DOCUMENTS

| | | |
|---|---|---|
| JP | 2004-220286 A | 8/2004 |
| JP | 2007-123981 A | 5/2007 |
| JP | 2007-336283 A | 12/2007 |
| JP | 2008-131432 A | 6/2008 |
| KR | 10-2007-0082701 A | 8/2007 |
| WO | 02/37498 A2 | 5/2002 |
| WO | 2007/039994 A1 | 4/2007 |

* cited by examiner

METHOD AND APPARATUS FOR FORMING HIGHLIGHT CONTENT

CROSS-REFERENCE TO RELATED PATENT APPLICATION

This application claims the benefit of Korean Patent Application No. 10-2009-0005151, filed on Jan. 21, 2009, in the Korean Intellectual Property Office, the disclosure of which is incorporated herein in its entirety by reference.

BACKGROUND

Methods and apparatuses consistent with the present invention relate to forming highlight content in a broadcasting program or a program provided by video-on-demand (VOD) services.

SUMMARY OF THE INVENTION

There is provided a method of forming highlight content of a broadcasting program or a program provided by VOD services by extracting content corresponding to a predetermined period of time before a point in time when a predetermined event occurs and content corresponding to the predetermined period of time after the point in time when the event occurs.

According to one aspect of the invention, there is provided a method of forming highlight content, the method including receiving a highlight content formation command which requests formation of the highlight content; detecting an event generation point-in-time for each event of a program from which the highlight content is to be formed, wherein the event generation point-in-time is a point of time at which an event occurs; and forming highlight content for each event from content corresponding to a predetermined period of time ranging before and after the event generation point-in-time.

The predetermined period of time may be set for each event.

The predetermined period of time may be determined based on a set highlight content playback time and the number of events occurring in the program.

The receiving of the highlight content formation command may include receiving a highlight content extraction time for each event.

The receiving of the highlight content formation command may include receiving information that represents a highlight content playback time.

The receiving of the highlight content formation command may include providing the highlight content playback time, if a highlight content extraction time for each event is received.

The detecting of the event generation point-in-time may be based on attributes of a sound including at least one criteria selected from a frequency and amplitude of a sound signal, which are received together with content.

The detecting of the event generation point-in-time may include detecting the event generation point-in-time based on additional information received together with content.

The additional information may include at least one criteria selected from meta data, audience rating information, and caption information.

The detecting of the event generation point-in-time may include detecting the event generation point-in-time from pre-stored content, and the forming of the highlight content for each event includes forming the highlight content for each event by using the pre-stored content.

The detecting of the event generation point-in-time and the forming of the highlight content for each event may be performed based on content and additional information from a storage device existing in a network.

According to another aspect of the invention, there is provided an apparatus for forming highlight content, the apparatus including a receiving unit receiving a highlight content formation command which requests formation of the highlight content; an event detection unit detecting an event generation point-in-time for each event of a program from which the highlight content is to be formed, wherein the event generation point-in-time is a point of time at which an event occurs; and a highlight content generation unit forming highlight content for each event from content corresponding to a predetermined period of time ranging before and after the event generation point-in-time.

The apparatus further may include a content extraction time determination unit which determines a period of time corresponding to content which is to be extracted based on the event generation point-in-time.

The content extraction time determination unit may determine a set period of time to be the period of time corresponding to the content which is to be extracted.

The content extraction time determination unit may determine the period of time corresponding to the to-be-extracted content based on a set highlight content playback time and the number of events occurring in the program, wherein highlight content for each event is extracted according to the determined period of time corresponding to the to-be-extracted content.

The event detection unit may detect the event generation point-in-time based on attributes of a sound that includes at least one selected from a frequency and amplitude of a sound signal, which are received together with content.

The event detection unit may detect the event generation point-in-time based on additional information received together with the content.

The additional information may include at least one of meta data, audience rating information, and caption information.

The apparatus may further include a storage device which stores a program from which the highlight content is to be formed.

The apparatus may further include a network interface which detects the event generation point-in-time for each event from a program stored in another storage device existing in the same network and extracting the highlight content for each event.

According to an aspect of the present invention, there is provided a computer-readable recording medium having recorded thereon a program for executing a method of forming highlight content, the method including receiving the highlight content formation command which requests the formation of the highlight content; detecting the event generation point-in-time for each event of the program from which the highlight content is to be formed, wherein the event generation point-in-time is a point of time at which an event occurs; and forming the highlight content for each event from content corresponding to the predetermined period of time ranging before and after the event generation point-in-time.

BRIEF DESCRIPTION OF THE DRAWINGS

The above and/or other aspects of the invention will become more apparent by describing in detail exemplary embodiments thereof with reference to the attached drawings in which.

DETAILED DESCRIPTION OF THE INVENTION

Exemplary embodiments will now be described with reference to the accompanying drawings.

Figure 1:
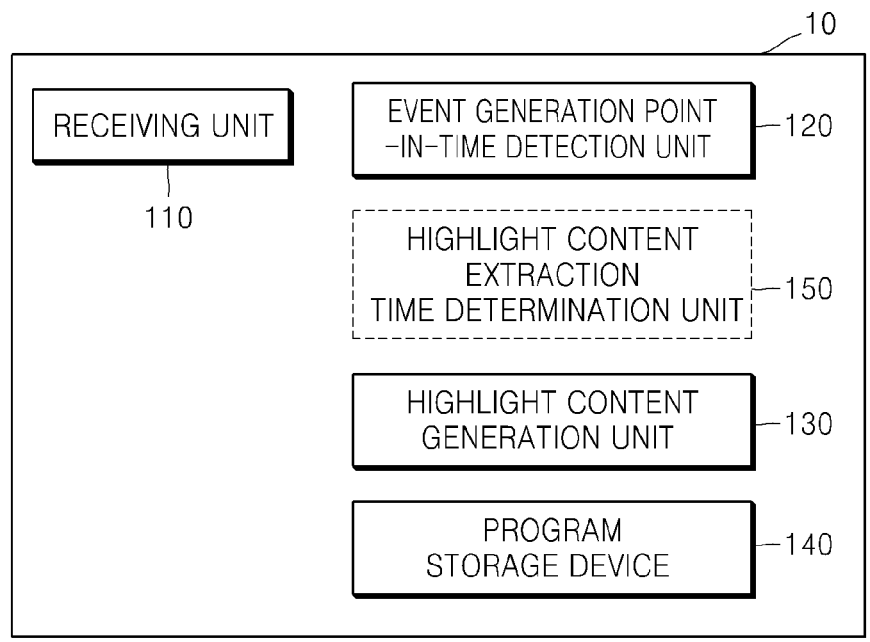
FIG. 1 is a block diagram of a highlight content forming apparatus according to an exemplary embodiment of the invention.

FIG. 1 is a block diagram of a highlight content forming apparatus 10 according to an exemplary embodiment. Referring to FIG. 1, the highlight content forming apparatus 10 includes a receiving unit 110 which receives a highlight playback command, an event generation point-in-time detection unit 120 which detects a point of time at which an event occurs, a highlight content generation unit 130 which extracts content corresponding to a predetermined period of time before and a predetermined period of time after the event occurs so as to generate highlight content, and a program storage device 140 which stores programs. Hereinafter, the point of time at which an event occurs will be referred to as the "event generation point-in-time."

The receiving unit 110 receives from a user several commands for controlling the highlight content forming apparatus 10. The receiving unit 110 may receive a highlight content formation command or a highlight playback command from the user. When the receiving unit 110 receives the highlight content formation command, a control unit (not shown) controls the event generation point-in-time detection unit 120 to detect an event included in a program stored in the program storage device 140.

The event generation point-in-time detection unit 120 detects the event according to several criteria. A main example of the event in an exemplary embodiment is a highlight scene that is displayed when a frequency and amplitude of a sound signal, corresponding to of shouts of joy of an audience, voices of announcers, or the like, rapidly increase in sports games. In other words, the frequency and amplitude of a sound signal is rapidly increased during goal-scoring scenes in a soccer game or home-run scenes in a baseball game. In other highlight scenes, shouts of joy of the audience increase. Thus, in an exemplary embodiment, the event generation point-in-time detection unit 120 detects the event based on at least one criteria selected from frequency and amplitude of a sound signal, which are received together with the content.

Another example of the event in an exemplary embodiment is an event that can be detected based on additional information received together with the content. A signal received from a broadcasting station, a video-on-demand (VOD) server, or the like, includes an additional information area in addition to a video area and an audio area. Several pieces of meta data about caption information or content may be inserted into the additional information area. Thus, a service provider such as a broadcasting station may indicate a highlight part through the meta data. In other words, when a service provider, such as a broadcasting company, designates a specific area of a program as a highlight and provides information about the specific area in the form of meta data, the event generation point-in-time detection unit 120 may detect an event based on the meta data.

When a service provider such as a broadcasting company provides subtitles by using caption data, the event generation point-in-time detection unit 120 may detect an event based on a specific word included in the subtitle. For example, the event generation point-in-time detection unit 120 may detect a goal-scoring event when the word "goal" is included in a portion of a subtitle displayed on a soccer game scene.

The additional information area according to an exemplary embodiment may also include audience rating information. The event generation point-in-time detection unit 120 may detect an event based on the audience rating information. A specific program such as a sports game has a tendency whereby the audience rating rapidly increases at the moment when an event occurs. In this case, a portion of a program, in which the audience rating rapidly increases, may be determined as the event generation point-in-time. The audience rating information may be provided to a broadcasting station, a hub apparatus, or the like. A method in which a hub apparatus provides an audience rating will be described later with reference to FIG. 6.

Although an event generation point-in-time in one exemplary embodiment may be detected based on at least one criteria selected from a frequency and amplitude of a sound signal received together with content or based on additional information received together with the content, the event generation point-in-time may also be detected based on a combination of the two above-stated factors. After the event generation point-in-time detection unit 120 detects the event generation point-in-time, the highlight content generation unit 130 extracts content corresponding to a predetermined period of time before the event generation point-in-time and content corresponding to the predetermined period of time after the event generation point-in-time, thereby generating highlight content.

As such, when a highlight content forming apparatus according to the exemplary embodiment is used, content corresponding to predetermined periods of time before and after an event generation point-in-time are used to form highlight content, and thus highlight content can be formed without missing content corresponding to the actual points of time when events occurred.

In addition, the highlight content forming apparatus 10 according to the exemplary embodiment may further include a highlight content extraction time determination unit 150 which determines a period of time to be extracted based on the event generation point-in-time so as to serve as highlight content. Hereinafter, the period of time will be referred to as a highlight content extraction time. More specifically, the highlight content extraction time determination unit 150 determines how long a period before and after the detected event generation point-in-time is to be extracted as a period of time to which highlight content corresponds.

In an example of a method in which the determination of the highlight content extraction time according to the exemplary embodiment is performed, a highlight content extraction time for each event may be determined by being designated by a user. At this time, the highlight content extraction time determination unit 150 may calculate a highlight content playback time by multiplying the total number of event generation points-in-time by the highlight content extraction time designated by the user and then provide the highlight content playback time to the user. In other words, if events occur at 5 different points of time and 5 minutes are designated for each event by the user, the highlight content playback time is 25 minutes. This highlight content playback time may be provided to the user, and the user may be asked if he or she wishes to proceed with the formation of the highlight content.

The highlight content forming apparatus according to the exemplary embodiment may allow a user to control a highlight content extraction time or a highlight content playback time, thereby forming highlight content without missing an event.

Figure 10:
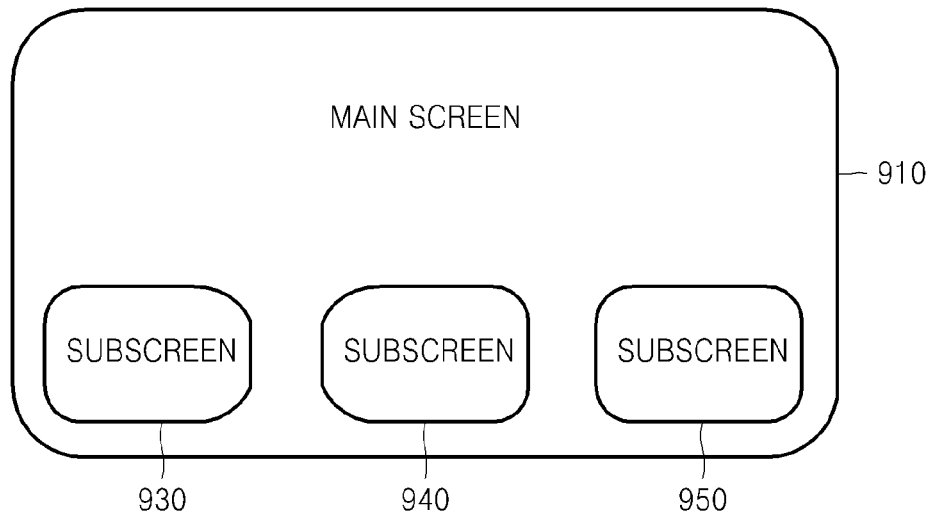
FIG. 10 illustrates a screen on which highlight content is played back, according to another exemplary embodiment of the invention.

The highlight content forming apparatus 10 according to the exemplary embodiment may also be used to form various items of highlight content from a plurality of programs, such as a plurality of sports game content items. For example, the highlight content forming apparatus 10 according to the exemplary embodiment may be equally applied to a case where a user desires to watch highlight content of a plurality of recently-played soccer games or a plurality of sports in the Olympic Games or games in the World-Cup. In this case, the event generation point-in-time detection unit 120 detects event generation points-in-time for a plurality of programs which are determined according to a predetermined period or a period input by the user and program types, or a plurality of programs selected by the user. The highlight content generation unit 130 generates items of highlight content corresponding to periods of time ranging between predetermined periods before and after the detected event generation points-in-time for the determined or selected programs. As illustrated in FIG. 10, the items of highlight content are played back on sub-screens for the respective programs so that the user can select desired content therefrom.

Figure 2:
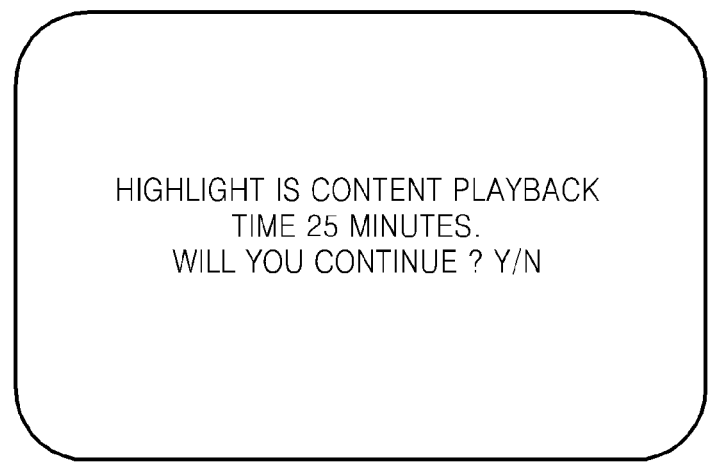
FIG. 2 illustrates a screen on which a user is informed about a highlight content playback time and the user is asked if he or she wishes to proceed with the formation of a highlight content, according to an exemplary embodiment of the invention.

FIG. 2 illustrates an example in which a user is informed about a highlight content playback time. If the user accepts the provided highlight content playback time, 25 minutes of highlight content is provided to the user. If the user thinks the provided highlight content playback time is too long, the user may shorten a playback time for each event.

In another example, the highlight content playback time may be designated by the user. In this case, the highlight content extraction time determination unit 150 may determine a highlight content extraction time for each event by dividing the highlight content playback time designated by the user by the number of event generation points-in-time. For example, if the user designates the highlight content playback time to be 10 minutes and the number of event generation points-in-time is 5, the playback time for each event is 2 minutes. Accordingly, the highlight content extraction time determination unit 150 may set the predetermined period of time for each event and extract content corresponding to one minute before each of the event generation points-in-time and content corresponding to one minute thereafter so as to form highlight content.

When the highlight content forming apparatus 10 according to the exemplary embodiment receives a highlight content formation command from a user, the highlight content forming apparatus 10 may allow the user to input a playback time for highlight content or a playback time for each of a plurality of events included in a program.

Figure 3:
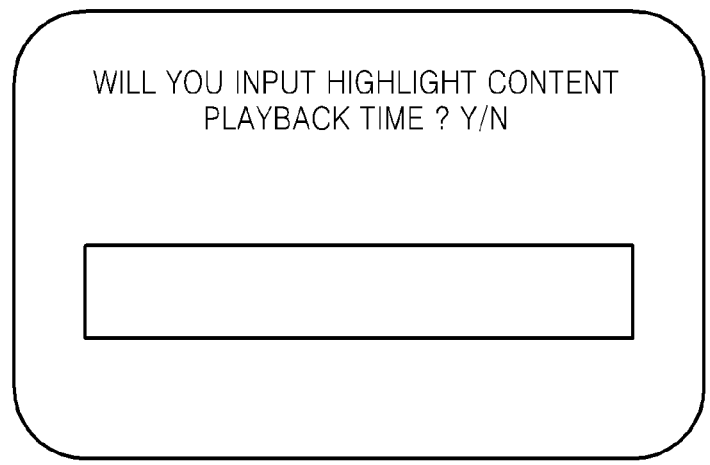
FIG. 3 illustrates a screen requesting a user to input a highlight content playback time, according to an exemplary embodiment of the invention.
Figure 4:
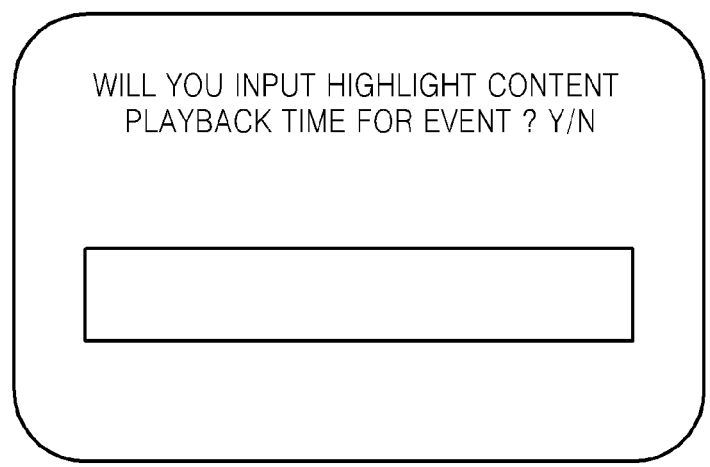
FIG. 4 illustrates a screen requesting a user to input a highlight content extraction time for each event, according to an exemplary embodiment of the invention.

FIG. 3 illustrates a screen that requests a user to input a highlight content playback time, according to an exemplary embodiment. FIG. 4 illustrates a screen that requests a user to input a highlight content extraction time for each event, according to an exemplary embodiment.

The highlight content extraction time according to one exemplary embodiment may be preset by the highlight content forming apparatus 10. When the highlight content extraction time determination unit 150 determines the highlight content extraction time for each event, the highlight content generation unit 130 generates highlight content by extracting content corresponding to the highlight content extraction time from content corresponding to a period of time ranging between predetermined periods before and after the event generation point-in-time detected by the event generation point-in-time detection unit 120. The content, which corresponds to a period of time ranging between predetermined periods before and after the event generation point-in-time, is stored in the program storage device 140.

The highlight content forming apparatus 10 according to an exemplary embodiment may be an apparatus including a program storage device such as a personal video recorder (PVR). However, a highlight content forming apparatus according to another exemplary embodiment may also be realized without the program storage device 140. A highlight content forming apparatus according to another exemplary embodiment will now be described with reference to FIG. 5.

Figure 5:
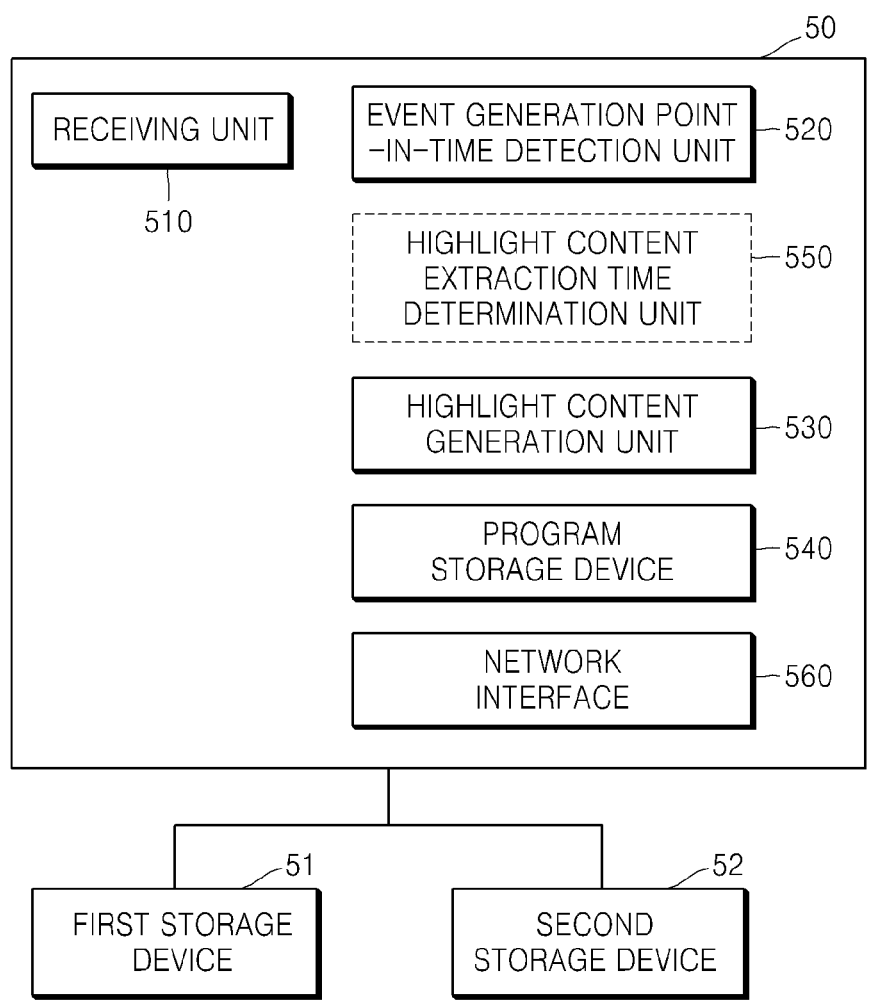
FIG. 5 is a block diagram of a highlight content forming apparatus according to an exemplary embodiment of the invention.

FIG. 5 is a block diagram of a highlight content forming apparatus 50 according to another exemplary embodiment, which forms highlight content even when programs are not stored in a program storage device. Portions of the highlight content forming apparatus 50 overlapped by the highlight content forming apparatus 10 of FIG. 1 will not be described again herein.

The highlight content forming apparatus 50 includes a network interface 560 which is connected to another storage device existing in a network. The highlight content forming apparatus 50 may communicate with other storage devices within the network via the network interface 560 in a peer-to-peer (P2P) manner, and extract highlight content from other storage devices existing in the network so as to form highlight content.

In other words, if the highlight content forming apparatus 50 is connected to storage devices 51 and 52 in the same network in a P2P manner and the storage devices 51 and 52 store a program which desires to form a highlight content therein, the highlight content forming apparatus 50 may receive content corresponding to a period of time ranging from predetermined periods of time before and after an event generation point-in-time detected by an event generation point-in-time detection unit 520, from the storage devices 51 and 52 in the same network in a P2P manner and form highlight content from the received content. The period of time is determined by a highlight content extraction time determination unit 530.

As such, the highlight image forming apparatus 50 may form highlight content even when a user did not perform reserved recording in advance, due to the communication in the P2P manner.

Although not shown in FIG. 5, the highlight content forming apparatus 50 may communicate in the P2P manner directly with other storage devices existing in the same network, and may also communicate with the other storage devices existing in the same network via a P2P server.

Figure 6:
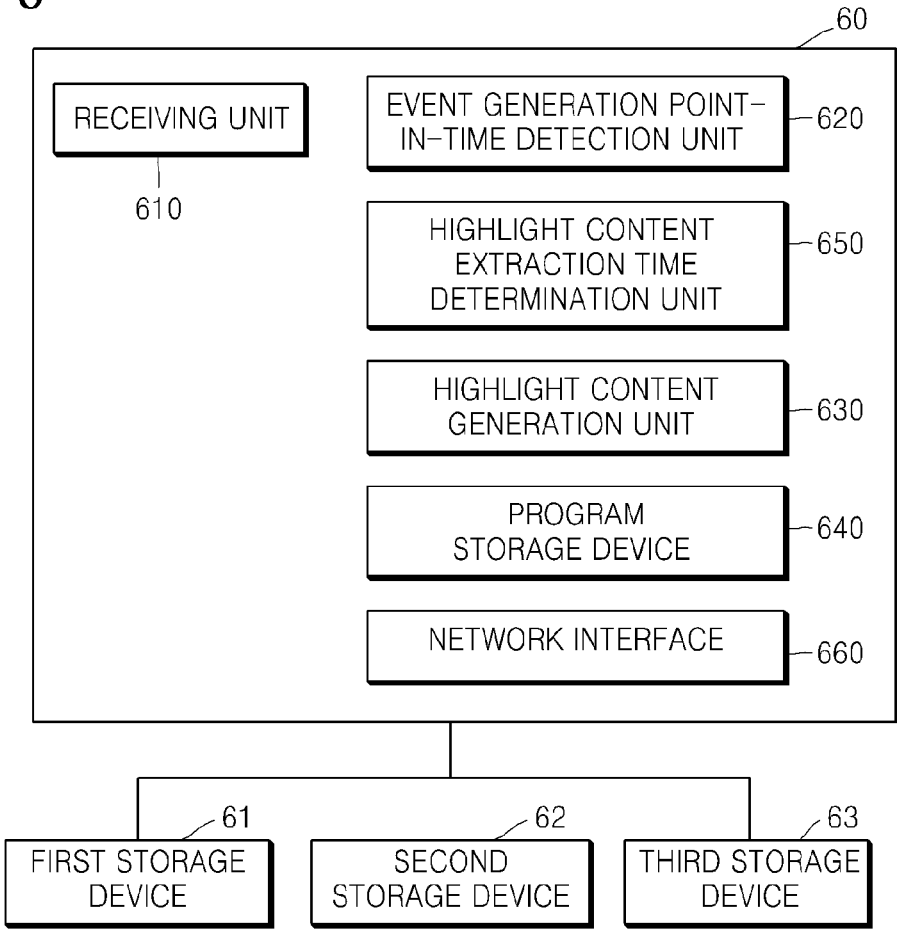
FIG. 6 is a block diagram of a highlight content forming apparatus according to another exemplary embodiment of the invention.

FIG. 6 is a block diagram of a highlight content forming apparatus using a hub apparatus 60, according to another exemplary embodiment. In the previous exemplary embodiment of FIG. 5, an apparatus such as a PVR in the house of a user forms highlight content. However, in the present exemplary embodiment, the hub apparatus 60 forms highlight content. The structure of the hub apparatus 60 is the same as that of the highlight content forming apparatus 50, and thus a detailed description thereof will be omitted here.

According to the exemplary embodiment, a user requests the hub apparatus 60 to form or play back highlight content. In response to the request, the hub apparatus 60 detects an event generation point-in-time, determines a highlight content extraction time, and forms highlight content. The highlight content forming apparatus may use the program storage device 650 of the hub apparatus 60 or use other storage devices 61, 62, and 63 in the same network.

The hub apparatus 60 may extract the event generation point-in-time based on audience rating information. The audience rating information may be obtained from the storage devices 61, 62, and 63 within the same network, and determine a specific point of time when the audience rating rapidly increases as being the event generation point-in-time.

Figure 7:
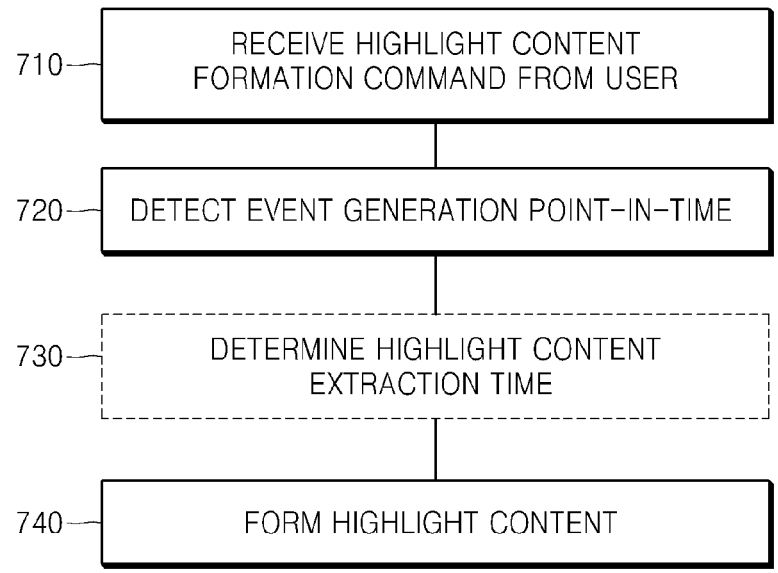
FIG. 7 is a flowchart of a highlight content forming method according to an exemplary embodiment of the invention.

FIG. 7 is a flowchart of a highlight content forming method according to an exemplary embodiment. Referring to FIG. 7, in operation 710, a highlight content forming apparatus receives a highlight content formation command from a user.

In operation 720, an event generation point-in-time is detected according to the received highlight content formation command. The event generation point-in-time is determined based on at least one criteria selected from a frequency and amplitude of a sound signal, which are received together with content, additional information received together with the content, or a combination of the two factors. The additional information received together with the content corresponds to at least one criteria selected from meta data, audience rating information, and caption information.

In operation 730, when the event generation point-in-time is detected, a highlight content extraction time is determined. The highlight content extraction time may be determined by being pre-set by the highlight content forming apparatus. A user may designate a playback time for each event. The user may also designate a playback time of highlight content including events.

In operation 740, when the highlight content extraction time is determined, highlight content is formed according to the event generation point-in-time and the highlight content extraction time. When the highlight content is formed, content stored in a storage device included in the highlight content forming apparatus may be used, or content may be extracted from program content stored in other storage devices existing in the same network by P2P communication. If operation 730 is not performed, content corresponding to predetermined periods of time before and after the event generation point-in-time detected in operation 720 may form the highlight content.

Figure 8:
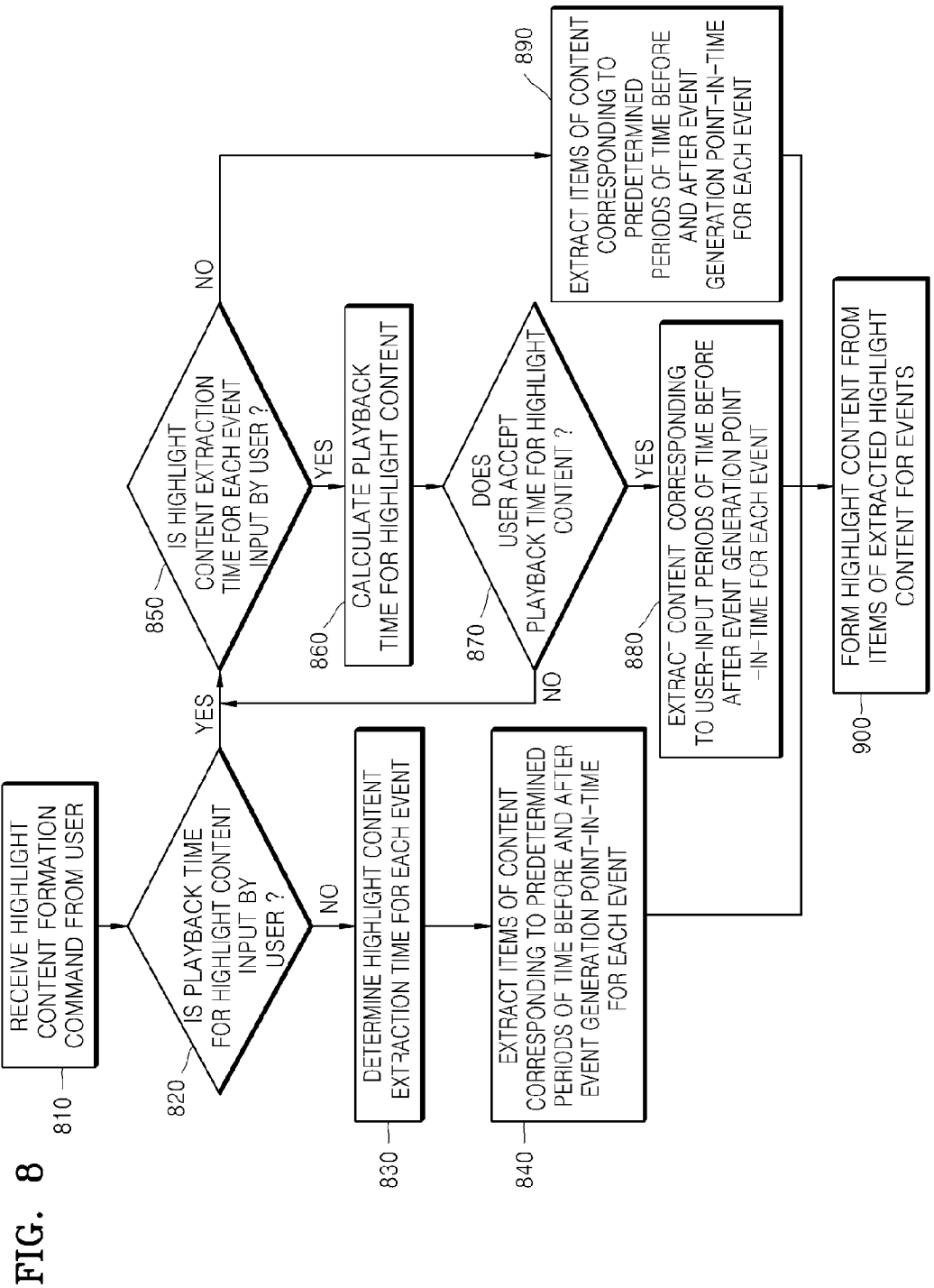
FIG. 8 is a flowchart of a highlight content forming method according to another exemplary embodiment of the invention.

FIG. 8 is a flowchart of a highlight content forming method according to another exemplary embodiment.

In operation 810, the highlight content forming apparatus receives a highlight content formation command from a user.

In operation 820, after the highlight content formation command is received from the user, if information representing a playback time for highlight content is received from the user, operation 830 is performed. On the other hand, if the information representing the playback time for highlight content is not received from the user, operation 850 is performed.

In operation 830, a highlight content extraction time for each event included in the highlight content is determined based on the playback time for the highlight content and the number of event generation points-in-time for the events.

In operation 840, images corresponding to predetermined periods of time before and after the event generation points-in-time for each event are extracted as highlight content for each event according to the highlight content extraction time determined in operation 830.

In operation 900, the highlight content is formed using the extracted items of highlight content for the events.

In operation 850, it is determined whether a highlight content extraction time for each event is input by the user. If the highlight content extraction time for each event is input by the user, operation 860 is performed. On the other hand, if the highlight content extraction time for each event is not input by the user, operation 890 is performed. Operation 850 may be performed by the highlight content forming apparatus requesting the user to input the highlight content extraction time for each event as illustrated in FIG. 4, if the information representing the playback time for the highlight content is not received from the user.

In operation 860, when the highlight content extraction time for each event is input by the user, a playback time for the highlight content is calculated using the highlight content extraction time for each event and the number of event generation points-in-time for the events included in the highlight content.

In operation 870, it is determined whether user accepts playback time for the highlight content, i.e., the playback time for the highlight content is provided to the user, and the user is asked if he or she wishes to proceed with the formation of the highlight content. If the user wants to change the playback time for the highlight content, the method may go back to operation 850.

Although not shown in FIG. 8, the user may be asked whether he or she wishes to input the playback time, and if he or she wishes to do so, operation 820 may be performed.

If the user accepts the playback time for the highlight content in operation 870, items of content corresponding to user-input periods of time before and after the event generation point-in-time for each event are extracted as highlight content for each event, in operation 880.

In operation 900, the highlight content is formed using the extracted items of highlight content for the events.

In operation 890, if the user does not want to input a playback time for each event in operation 850, items of content corresponding to predetermined periods of time before and after the event generation point-in-time for each event are extracted as highlight content for each event. In the present exemplary embodiment, the user is asked to input the playback time for the highlight content in advance. However, in other exemplary embodiments, the user may be asked to input a highlight content extraction time for each event in advance.

Figure 9:
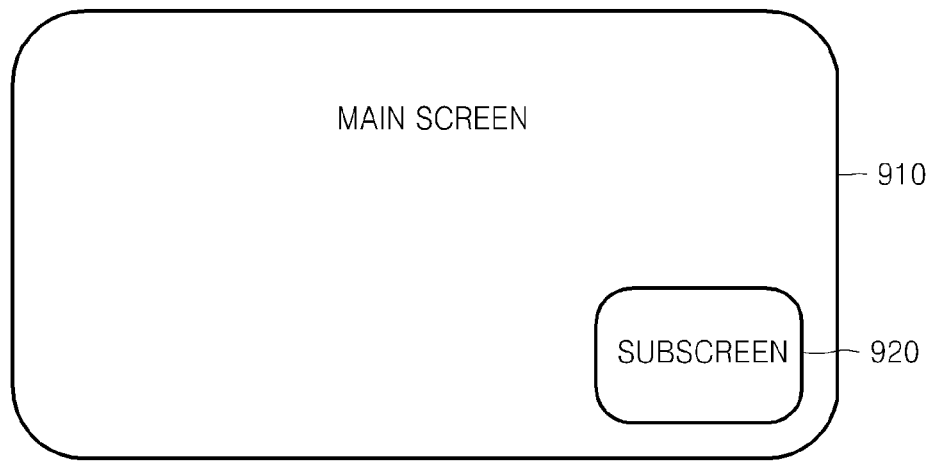
FIG. 9 illustrates a screen on which highlight content is played back, according to an exemplary embodiment of the invention.

FIG. 9 illustrates a screen on which highlight content is played back, according to an exemplary embodiment. As illustrated in FIG. 9, a main program and highlight content may be displayed on a main screen 910 and a sub-screen 920, respectively, and vice versa. According to a user's desire, no sub-screens may exist, and the highlight content may be displayed on the entire area of the main screen 910.

FIG. 10 illustrates a screen on which highlight content is played back, according to another exemplary embodiment. As illustrated in FIG. 10, a main program may be displayed on a main screen 910, and items of highlight content for a plurality of events may be displayed on a plurality of sub-screens 930, 940, and 950. The sub-screens 930, 940, and 950 may display items of highlight content for different time periods or items of highlight content for different programs. According to a user's desire, no special sub-screens may exist, and the items of highlight content may be sequentially displayed on the entire area of the main screen 910.

The exemplary embodiments can be embodied as computer programs and can be implemented in digital computers that execute the programs from computer readable recording medium. Examples of the computer readable recording medium include magnetic storage media (e.g., ROM, floppy disks, hard disks, etc.) and optical recording media (e.g., CD-ROMs, or DVDs).

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of forming highlight content, the method comprising:
   receiving a highlight content formation command which requests formation of the highlight content;
   detecting an event generation point-in-time for each event of a program from which the highlight content is to be formed, wherein the event generation point-in-time is a time at which an event occurs;
   determining a playback time for each event based on dividing a set highlight content playback time by a number of detected event generation-point-in-times occurring in the program;
   forming highlight content for each event of the program, from content corresponding to a predetermined period of time before the event generation point-in-time and the predetermined period of time after the event generation point-in-time,
   wherein the predetermined period of time corresponds to a number which is half of the determined playback time for each event.

2. The method of claim 1, wherein the receiving the highlight content formation command comprises receiving information that represents a highlight content playback time.

3. The method of claim 1, wherein the detecting the event generation point-in-time is based on attributes of a sound that comprise at least one of a frequency and amplitude of a sound signal, which are received together with content.

4. The method of claim 1, wherein the detecting of the event generation point-in-time comprises detecting the event generation point-in-time based on additional information received together with content.

5. The method of claim 4, wherein the additional information comprises at least one of meta data, audience rating information, and caption information.

6. The method of claim 1, wherein the detecting the event generation point-in-time comprises detecting the event generation point-in-time from pre-stored content, and
   wherein the forming the highlight content for each event comprises forming the highlight content for each event by using the pre-stored content.

7. The method of claim 1, wherein the detecting the event generation point-in-time and the forming of the highlight content for each event are performed based on content and additional information from a storage device existing in a network.

8. A non-transitory computer-readable recording medium having recorded thereon a program for executing the method of claim 1.

9. An apparatus for forming highlight content, the apparatus comprising:
   at least one processor which executes:
   a receiving device which receives a highlight content formation command which requests formation of the highlight content;
   an event detection device which detects an event generation point-in-time for each event of a program from which the highlight content is formed, wherein the event generation point-in-time is a time at which an event occurs;
   a content extraction time determination device which determines a playback time for each event based on dividing a set highlight content playback time by a number of detected event generation-point-in-times occurring in the program;
   a highlight content generation device which forms highlight content for each event of the program, from content corresponding to a predetermined period of time before the event generation-point-in-time and the predetermined period of time after the event generation point-in-time,
   wherein the predetermined period of time corresponds to a number which is half of the determined playback time for each event.

10. The apparatus of claim 9, wherein the event detection device detects the event generation point-in-time based on attributes of a sound comprising at least one of a frequency and amplitude of a sound signal, which are received together with content.

11. The apparatus of claim 9, wherein the event detection device detects the event generation point-in-time based on additional information received together with the content.

12. The apparatus of claim 11, wherein the additional information comprises at least one of meta data, audience rating information, and caption information.

13. The apparatus of claim 9, further comprising a storage device which stores a program from which the highlight content is to be formed.

14. The apparatus of claim 9, further comprising a network interface which detects the event generation point-in-time for each event from a program stored in another storage device existing in a same network and extracting the highlight content for each event.

* * * * *